US012656602B2

(12) United States Patent　　　　　(10) Patent No.:　US 12,656,602 B2
Catching　　　　　　　　　　　　　　(45) Date of Patent:　Jun. 16, 2026

(54) OPTICAL ASSEMBLY

(71) Applicant: VIAVI Solutions Inc., Chandler, AZ (US)

(72) Inventor: Benjamin F. Catching, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 300 days.

(21) Appl. No.: 18/463,075

(22) Filed: Sep. 7, 2023

(65) Prior Publication Data

US 2024/0103267 A1　　Mar. 28, 2024

Related U.S. Application Data

(60) Provisional application No. 63/375,621, filed on Sep. 14, 2022.

(51) Int. Cl.
　　*G02B 27/00*　　　(2006.01)
　　*G02B 5/28*　　　　(2006.01)
(52) U.S. Cl.
　　CPC ........... *G02B 27/0025* (2013.01); *G02B 5/28* (2013.01)
(58) Field of Classification Search
　　CPC ...... G02B 27/0025; G02B 5/28; G02B 7/005; G02B 5/20
　　See application file for complete search history.

(56) References Cited

U.S. PATENT DOCUMENTS

| | | | | |
|---|---|---|---|---|
| 5,117,126 A | * | 5/1992 | Geiger | ...................... G02F 1/39 |
| | | | | 359/328 |
| 2003/0007225 A1 | * | 1/2003 | Hsieh | ................. G02B 6/29367 |
| | | | | 398/212 |
| 2003/0048972 A1 | * | 3/2003 | Lin | ....................... G02B 6/2746 |
| | | | | 385/11 |
| 2004/0109487 A1 | * | 6/2004 | Zhang | ................. H01S 3/08031 |
| | | | | 372/20 |

(Continued)

FOREIGN PATENT DOCUMENTS

| | | | | | |
|---|---|---|---|---|---|
| CN | 117706762 A | * | 3/2024 | ............. | G02B 27/00 |
| JP | 2014233344 A | * | 12/2014 | | |
| WO | WO-9007108 A1 | * | 6/1990 | ................ | G01J 3/44 |

OTHER PUBLICATIONS

Extended European Search Report for Application No. EP23197153.2, mailed on Feb. 7, 2024, 9 pages.

*Primary Examiner* — William Lu

(74) *Attorney, Agent, or Firm* — Harrity & Harrity, LLP

(57) ABSTRACT

An optical assembly includes a housing, and an optical filter and an optical compensator disposed within the housing. The optical filter is oriented at a first non-zero angle in a first tilt direction with respect to an optical axis of the optical assembly. The optical compensator is oriented at a second non-zero angle in a second tilt direction with respect to the normal of the optical axis of the optical assembly. The optical filter is configured to pass, to the optical compensator, a portion of an optical beam that impinges on the optical filter along an optical axis of the optical assembly, such that the portion of the optical beam is offset from the optical axis. The optical compensator is configured to cause the portion of the optical beam to propagate out of the optical assembly along the optical axis of the optical assembly (or with a minimized offset).

20 Claims, 4 Drawing Sheets

(56)          References Cited

U.S. PATENT DOCUMENTS

| | | | |
|---|---|---|---|
| 2004/0125374 A1* | 7/2004 | Berger | G01J 3/18 |
| | | | 356/364 |
| 2004/0130764 A1* | 7/2004 | Stenger | G02B 6/2937 |
| | | | 359/892 |
| 2005/0110999 A1* | 5/2005 | Erdogan | G01J 3/4406 |
| | | | 356/417 |
| 2005/0147134 A1* | 7/2005 | McDonald | G02B 26/001 |
| | | | 372/9 |
| 2006/0087739 A1* | 4/2006 | Ockenfuss | G02B 5/285 |
| | | | 359/586 |
| 2007/0003189 A1* | 1/2007 | Kaneko | G02B 6/4204 |
| | | | 385/39 |
| 2010/0160749 A1* | 6/2010 | Gross | A61B 5/1459 |
| | | | 600/316 |
| 2010/0195209 A1* | 8/2010 | Brown | G02B 5/288 |
| | | | 359/578 |
| 2011/0058256 A1* | 3/2011 | Brown | G02B 26/007 |
| | | | 359/578 |
| 2012/0026466 A1* | 2/2012 | Zhou | G02B 17/0896 |
| | | | 351/214 |
| 2017/0343825 A1* | 11/2017 | Sinha | G01J 3/02 |
| 2020/0088579 A1* | 3/2020 | Balas | G01J 3/2823 |

* cited by examiner

300

Bus
310

Processor
320

Memory
330

Input
Component
340

Output
Component
350

Communication
Component
360

400

410  Cause an optical filter of the optical assembly to be oriented at a first non-zero angle 420  Cause an optical compensator of the optical assembly to be oriented at a second non-zero angle

OPTICAL ASSEMBLY

CROSS-REFERENCE TO RELATED APPLICATION

This patent application claims priority to U.S. Provisional Patent Application No. 63/375,621, filed on Sep. 14, 2022, and entitled "CORRECTION OF OPTICAL BEAM OFF-SET." The disclosure of the prior application is considered part of and is incorporated by reference into this patent application.

BACKGROUND

An optical filter is configured to pass optical beams associated with a spectral range (e.g., that impinge on the optical filter). That is, the optical filter may be configured to pass optical beams associated with wavelengths that are greater than or equal to a minimum wavelength associated with the spectral range and that are less than or equal to a maximum wavelength associated with the spectral range.

SUMMARY

In some implementations, an optical assembly comprises a housing; an optical filter disposed within the housing; and an optical compensator disposed with the housing, wherein: the optical filter is oriented at a first non-zero angle in a first tilt direction with respect to a normal of an optical axis of the optical assembly, the optical compensator is oriented at a second non-zero angle in a second tilt direction, which is opposite to the first tilt direction, with respect to the normal of the optical axis of the optical assembly, and an absolute value of the second non-zero angle is less than an absolute value of the first non-zero angle.

In some implementations, an optical assembly comprises an optical filter; and an optical compensator, wherein: the optical filter is oriented at a first non-zero angle in a first tilt direction with respect to a normal of an optical axis of the optical assembly, and the optical compensator is oriented at a second non-zero angle in a second tilt direction with respect to the normal of the optical axis of the optical assembly.

In some implementations, a method includes causing, by a controller of an optical assembly, an optical filter of the optical assembly to be oriented at a first non-zero angle in a first tilt direction with respect to a normal of an optical axis of the optical assembly; and causing, by the controller, an optical compensator of the optical assembly to be oriented at a second non-zero angle in a second tilt direction with respect to the normal of the optical axis of the optical assembly.

DETAILED DESCRIPTION

Figure 1:
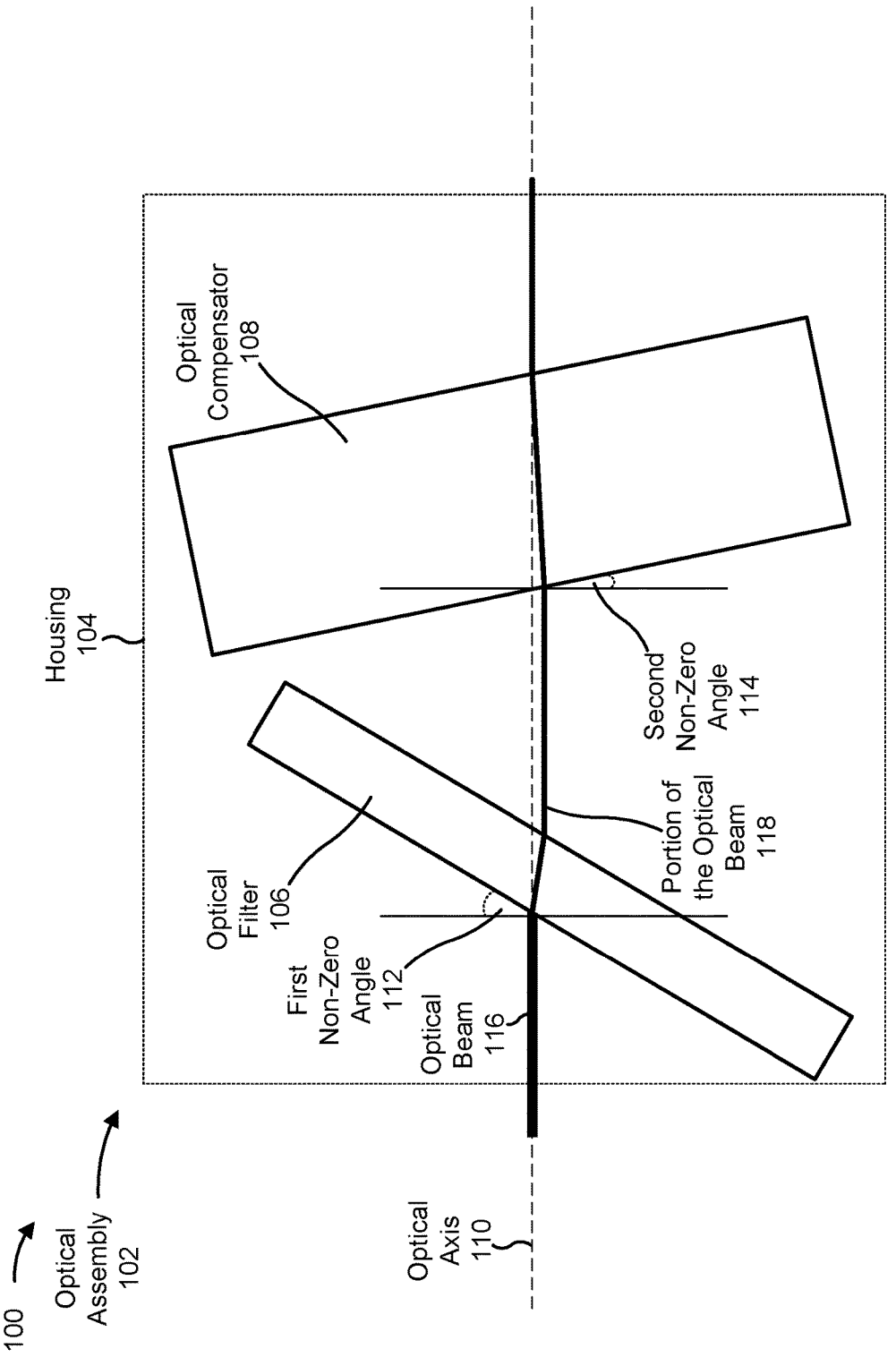
FIG. 1 is a diagram of an example described herein.

The following detailed description of example implementations refers to the accompanying drawings. The same reference numbers in different drawings may identify the same or similar elements.

An optical system, such as an optical communication system, often includes an optical assembly that houses an optical element, such as an optical filter. An optical beam is to propagate to the optical assembly along an optical axis of the optical assembly, be filtered by the optical filter, and then propagate away from the optical assembly along the optical axis of the optical assembly (e.g., to another optical element of the optical system, such as an optical sensor element). However, in many cases, such as when the optical filter is oriented at a non-zero angle with respect to a normal of the optical axis of the optical assembly, an optical beam can impinge on the optical filter at the non-zero angle (e.g., due to an optical thickness and/or an index of refraction of the optical filter), which causes the optical beam to propagate from the optical filter such that the optical beam is offset (e.g., laterally offset) from the optical axis. This can prevent the optical beam from reaching (e.g., propagating to) its destination (e.g., an optical sensor element), or from reaching a preferred region of the destination. This impacts a performance of the optical system.

Some implementations described herein include an optical assembly. The optical assembly includes an optical filter and an optical compensator (e.g., disposed within a housing of the optical assembly). The optical filter is oriented at a first non-zero angle in a first tilt direction with respect to a normal of the optical axis of the optical assembly, and the optical compensator is oriented at a second non-zero angle in a second tilt direction with respect to the normal of the optical axis of the optical assembly.

Accordingly, the optical filter is disposed within the optical system such that the optical filter is oriented at the first non-zero angle to a propagation direction of an optical beam that is to propagate through the optical assembly (e.g., the propagation direction has a first non-zero angle of incidence in relation to a normal of an input surface of the optical filter). The optical filter is configured to pass a portion of the optical beam and to cause (e.g., due to an optical thickness of the optical filter and/or another optical characteristic of the optical filter) the portion of the optical beam to propagate from the optical filter (e.g., an output surface of the optical filter) such that the portion of the optical beam is offset (e.g., laterally offset) from the optical axis.

Moreover, the optical compensator is disposed within the optical system such that the optical compensator is "behind" the optical filter, such that the optical beam is to propagate through the optical filter before propagating through the optical compensator. The optical compensator is oriented at the second non-zero angle to the offset propagation direction of the portion of the optical beam (e.g., the offset propagation direction has a second non-zero angle of incidence in relation to a normal of the input surface of optical compensator). The optical compensator is configured to transmit the portion of the optical beam (e.g., that is passed by the optical filter) and to cause (e.g., due to an optical thickness of the optical compensator and/or another optical characteristic of the optical filter) the portion of the optical beam to propagate from the optical compensator (e.g., from an output surface of the optical compensator) such that the portion of the optical beam is no longer offset (e.g., laterally offset) from the optical axis or is minimally offset from the optical axis. That is, the optical compensator is configured to cause the portion of the optical beam to propagate from the optical assembly along the optical axis of the optical assembly (or with a minimized offset from the optical axis).

In this way, the optical assembly improves a likelihood that the portion of the optical beam propagates to its destination (e.g., an optical sensor element) or to a preferred region of the destination (e.g., a particular portion of the optical sensor element). This thereby improves a performance of the optical system that includes the optical assembly.

Further, in some implementations, the optical filter has a first optical thickness and the optical compensator has a second optical thickness, wherein the first optical thickness is less than the second optical thickness. That is, the optical compensator has a greater optical thickness than that of the optical filter. This allows the optical compensator to be tilted (e.g., in the second tilt direction), with respect to the normal of the optical axis of the optical assembly, less than the optical filter is tilted (e.g., in the first tilt direction), while enabling reduction of an offset of an optical beam propagating through the optical assembly (e.g., as further described herein). Accordingly, an absolute value of the second non-zero angle is less than an absolute value of the first non-zero angle.

In this way, because the optical compensator needs to be minimally tilted (e.g., in comparison to the optical filter), both the optical filter and the optical compensator may be disposed within a same housing of the optical assembly (e.g., because a limited range of motion of the optical compensator reduces an amount of space needed to tilt the optical compensator). In some cases, this would not be possible (e.g., due to a form factor size restriction of the optical assembly) if an optical compensator that had a same optical thickness as the optical filter were to be used (e.g., because the optical compensator would need to be tilted, in the second direction, at least an equal amount as the optical filter is tilted in the first direction). Further, by including the optical filter and the optical compensator within a same housing of the optical assembly, a separate optical compensator does not need to be included in the optical system (e.g., between the optical assembly and the destination of the portion of the optical beam). This enables simplification of a design, maintenance, and use of the optical system, and enables a reduction in an overall size of the optical system.

In some implementations, the optical filter and the optical compensator are each configured to be dynamically tilted (e.g., about a pivot point), such as by a controller of the optical assembly. Accordingly, the optical filter may be configured to be adjusted to a first dynamic non-zero angle and the optical compensator may be configured to be adjusted to a second dynamic non-zero angle based on operation requirements of the optical assembly and/or the optical system.

FIG. 1 is a diagram of an example 100. As shown in FIG. 1, example 100 may include an optical assembly 102. The optical assembly 102 may be included in an optical system, such as an optical communication system, where an optical beam (e.g., a laser beam) is to propagate to the optical assembly 102 (e.g., to a first end of the optical assembly 102) along an optical axis of the optical assembly 102, and the optical beam, or a portion of the optical beam, is to propagate from the optical assembly 102 (e.g., out of the optical assembly 102 from a second end of the optical assembly 102) along the optical axis.

As shown in FIG. 1, the optical assembly 102 may include a housing 104, and one or more optical elements, such as an optical filter 106 and/or an optical compensator 108. The housing 104 may surround, encase, and/or hold one or more optical components of the optical assembly 102. That is, the one or more optical elements of the optical assembly 102 may be disposed within the housing 104 (e.g., may be disposed within an internal environment of the housing 104). In some implementations, the housing 104 may have a first end (shown as a left end of the housing 104 in FIG. 1) and a second end (shown as a right end of the housing 104 in FIG. 1). Each of the first end of the housing 104 and the second end of the housing 104 may include an opening (e.g., an aperture, a window, or another type of opening) through which an optical beam may enter and exit the housing 104. The respective openings of the first end of the second end of the housing 104 may be disposed on an optical axis 110 of the optical assembly 102 (e.g., to allow an optical beam 116 to propagate into and out of the housing 104 along the optical axis).

The optical filter 106 may be configured to pass optical beams associated within a spectral range (e.g., that impinge on the optical filter 106). That is, the optical filter 106 may be configured to pass optical beams associated with wavelengths that are greater than or equal to a minimum wavelength associated with the spectral range and that are less than or equal to a maximum wavelength associated with the spectral range. For example, when the optical filter 106 is configured to pass optical beams associated with a spectral range from 1530 nanometers (nm) to 1565 nm, the optical filter 106 may be configured to pass optical beams associated with wavelengths that are greater than or equal to 1530 nm and less than or equal to 1565 nm.

In some implementations, the optical filter 106 may include an optical interference filter (e.g., a thin film optical interference filter). Additionally, or alternatively, the optical filter 106 may include, for example, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or another filter.

In some implementations, the optical filter 106 may have an angle-dependent wavelength characteristic (with respect to the spectral range), also referred to as an angle shift characteristic (with respect to the spectral range). That is, the optical filter 106 may pass optical beams associated with different subranges of the spectral range based on respective incidence angles of the optical beams when the optical beams impinge on the optical filter 106. For example, the optical filter 106 may pass first optical beams that are associated with a first subrange of the spectral range and that impinge on the optical filter 106 within a first incidence angle range, may pass second optical beams that are associated with a second subrange of the spectral range and that impinge on the optical filter 106 within a second incidence angle range, may pass third optical beams that are associated with a third subrange of the spectral range and that impinge on the optical filter 106 within a third incidence angle range, and so on. The angle shift characteristic may be represented by the following equation:

$$\lambda_\theta = \lambda_0 \left[ 1 - \frac{n_0}{n_e}\sin^2\theta \right]^{1/2},$$

where $\lambda_\theta$ represents a peak wavelength at incidence angle $\theta$, $\lambda_\theta$ represents a peak wavelength at incidence angle 0 (zero), $n_0$ represents a refractive index of the incidence medium, $n_e$ represents an effective index of the optical filter 106, and $\theta$ is the incidence angle of an optical beam. In some implementations, the optical filter 106 may be configured to pass optical beams associated with shorter wavelengths as the optical beams impinge on the optical filter 106 at greater incidence angles.

The optical compensator 108 may be configured to be transmissive to optical beams associated with one or more spectral ranges, such as the spectral range that the optical filter is configured to pass. The optical compensator may include, for example, a material that includes at least a glass, a polymer, silicon, or germanium.

Each of the optical filter 106 and the optical compensator 108 may have an input surface and an output surface. In some implementations, each of the optical filter 106 and the optical compensator 108 may be configured to have a "plate" structure, such that the input surface is parallel (or substantially parallel) to the output surface for each of the optical filter 106 and the optical compensator 108. For example, as shown in FIG. 1, the respective input surfaces and output surfaces of the optical filter 106 and the optical compensator 108 may be the respective left and right surfaces of the optical filter 106 and the optical compensator 108 (e.g., that are disposed on the optical axis 110 of the optical assembly 102).

Additionally, each of the optical filter 106 and the optical compensator 108 may have an optical thickness. For example, the optical filter 106 may have a first optical thickness, and the optical compensator 108 may have a second optical thickness. The first optical thickness may be the same as (e.g., equal to) the second optical thickness. Alternatively, the first optical thickness may be different than the second optical thickness. For example, the first optical thickness may be less than the second optical thickness.

Moreover, each of the optical filter 106 and the optical compensator 108 may have an index of refraction. For example, the optical filter 106 may have a first index of refraction, and the optical compensator 108 may have a second index of refraction. The first index of refraction may be the same as (e.g., equal to) the second index of refraction. Alternatively, the first index of refraction may be different than the second index of refraction. For example, the first index of refraction may be less than the second index of refraction.

As shown in FIG. 1, the optical filter 106 and the optical compensator may each be disposed on the optical axis 110 of the optical assembly 102 (e.g., within the housing 104). The optical filter 106 may be disposed along the optical axis such that the optical filter 106 is oriented at a first non-zero angle 112 (e.g., in a first tilt direction, shown as clockwise) with respect to a normal of the optical axis of the optical assembly 102. As further shown in FIG. 1, the optical compensator 108 may be disposed along the optical axis 110 of the optical assembly 102 such that the optical compensator 108 is oriented at a second non-zero angle 114 (e.g., in a second tilt direction that is opposite to the first tilt direction, shown as counterclockwise) with respect to the normal of the optical axis 110 of the optical assembly 102. In some implementations, an absolute value of the second non-zero angle 114 may be less than an absolute value of the first non-zero angle 112.

The first non-zero angle 112 and the second non-zero angle 114 may be associated with one or more respective optical properties of the optical filter 106 and the optical compensator 108, such as the first optical thickness of the optical filter 106 and the second optical thickness of the optical compensator 108. For example, the second non-zero angle 114 (e.g., an absolute value of the second non-zero angle 114) may be based on the first non-zero angle 112 (e.g., an absolute value of the first non-zero angle 112) and a relationship based on the first optical thickness of the optical filter 106 and the second optical thickness of the optical compensator 108 (e.g., a ratio of the first optical thickness to the second optical thickness). As a specific example, the second non-zero angle 114 may be represented by the following equation: $\theta_2 = \theta_1 \times (OT_1/OT_2) \times F$, where $\theta_1$ represents the absolute value of the first non-zero angle 112, $\theta_2$ represents the absolute value of the second non-zero angle 114, $OT_1$ represents the first optical thickness, $OT_2$ represents the second optical thickness, and F represents a compensation factor (e.g., a constant compensation factor, or, alternatively, a non-constant compensation factor based on the first non-zero angle 112, the first optical thickness, and/or the second optical thickness).

Accordingly, as shown in FIG. 1, the optical assembly 102 may be configured to allow an optical beam 116 to propagate along the optical axis 110 and into the optical assembly 102 (e.g., into the housing 104 of the optical assembly 102 via the first end of the optical assembly 102). The optical beam 116 may thereby impinge on the input surface of the optical filter 106 (e.g., along the optical axis 110). The optical filter 106, when oriented at the first non-zero angle 112, may pass a portion of the optical beam 116 (referred to as a portion of the optical beam 118). The portion of the optical beam 118 may be associated with a subrange of the spectral range that the optical filter 106 is configured to pass, such as due to the optical beam 116 impinging on the input surface of the optical filter 106 at the first non-zero angle 112 and due to the angle shift characteristic of the optical filter 106. Further, the optical filter 106 may cause the portion of the optical beam 118 to propagate from the output surface of the optical filter 106 (e.g., parallel to, or substantially parallel to, the optical axis 110 of the optical assembly 102). In some implementations, such as due to the first optical thickness of the optical filter 106 and/or the first index of refraction of the optical filter 106, the optical filter 106 may cause the portion of the optical beam 118 to propagate from the output surface of the optical filter 106 such that the portion of the optical beam 118 is offset from the optical axis 110 of the optical assembly 102 by a first offset distance. That is, the optical filter 106 may cause the portion of the optical beam 118 to propagate from the output surface of the optical filter 106 parallel to (or substantially parallel to) the optical axis 110 of the optical assembly 102, but not along the optical axis 110. The first offset distance may satisfy (e.g., may be less than or equal to) a first offset distance threshold, which may, for example, be less than or equal to 0.1 nm, 0.5 nm, 1 nm, 1.5 nm, or 2 nm.

The portion of the optical beam 118 may then propagate to the optical compensator 108 (e.g., on an optical path that is offset from the optical axis 110 of the optical assembly 102 by the first offset distance) and may thereby impinge on the input surface of the optical compensator 108 (e.g., along the optical path that is offset from the optical axis 110). The optical compensator 108, when oriented at the second non-zero angle 114, may transmit the portion of the optical beam 118 (e.g., allow the portion of the optical beam 118 to propagate through the optical compensator 108). Further, the optical compensator 108 may cause the portion of the optical beam 118 to propagate from the output surface of the optical compensator 108. In some implementations, such as due to the second optical thickness of the optical compensator 108 and/or the second index of refraction of the optical compensator 108, the optical compensator 108 may cause the portion of the optical beam 118 to propagate from the output surface of the optical compensator 108 along the optical axis 110 of the optical assembly 102 or offset from the optical axis 110 by a second offset distance (e.g., that is less than the first offset distance). That is, the optical compensator 108 may cause the portion of the optical beam 118 to propagate from the output surface of the optical compensator 108 along the optical axis 110 of the optical assembly 102 or offset from the optical axis 110 by a reduced distance. The second offset distance may be less than the first offset distance and may satisfy (e.g., may be less than or equal to) a second offset distance threshold, which may be less than or equal to 0.1 nm, 0.5 nm, 1 nm, 1.5 nm, or 2 nm.

As indicated above, FIG. 1 is provided as an example. Other examples may differ from what is described with regard to FIG. 1.

Figure 2:
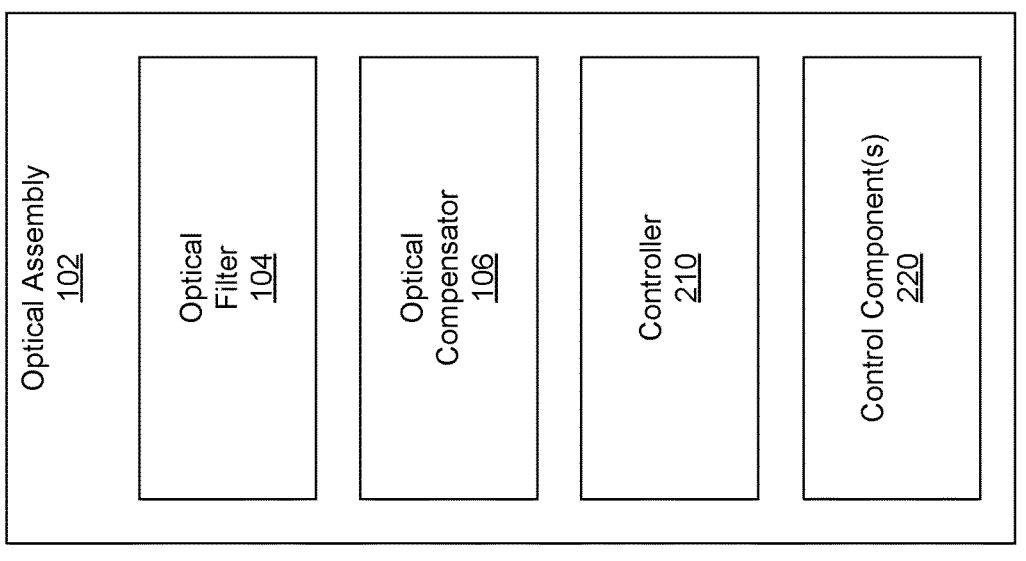
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the optical assembly 102, which may include the optical filter 106, the optical compensator 108, a controller 210, and/or one or more control components 220. Devices of environment 200 may interconnect via wired connections, wireless connections, or a combination of wired and wireless connections.

The controller 210 includes one or more devices capable of receiving, generating, storing, processing, and/or providing information, such as the information described herein. The controller 210 may include a communication device and/or a computing device. For example, the controller 210 may include a wireless communication device, a wired communication device, or a combination wired and wireless communication device. In some implementations, the controller 210 may receive information from and/or transmit information to another device in environment 200, such as the one or more control components 220.

The controller 210 may be configured to control orientation of the optical filter 106 (e.g., with respect to the normal of the optical axis 110 of the optical assembly 102) and/or to control orientation of the optical compensator 108 (e.g., with respect to the normal of the optical axis 110 of the optical assembly 102). For example, with respect to FIG. 1, the controller 210 may cause the optical filter 106 of the optical assembly 102 to be oriented at the first non-zero angle 112 (e.g., in the first tilt direction with respect to the normal of the optical axis 110 of the optical assembly 102) and/or may cause the optical compensator 108 of the optical assembly 102 to be oriented at the second non-zero angle 114 (e.g., in the second tilt direction with respect to the normal of the optical axis 110 of the optical assembly 102). The controller 210 may determine the first non-zero angle 112 for the optical filter 106 (e.g., based on the angle shift characteristic of the optical filter 106), and then may determine the second non-zero angle 114 based on the first non-zero angle 112 and the relationship based on the first optical thickness of the optical filter 106 and the second optical thickness of the optical compensator 108 (e.g., as described herein in relation to FIG. 1).

In some implementations, the controller 210 (e.g., after causing the optical filter 106 to be oriented at the first non-zero angle 112 and/or causing the optical compensator 108 to be oriented at the second non-zero angle 114) may cause the optical filter 106 to be oriented at a different first non-zero angle (e.g., in the first tilt direction with respect to the normal of the optical axis 110 of the optical assembly 102) and/or may cause the optical compensator 108 to be oriented at a different second non-zero angle (e.g., in the second tilt direction with respect to the normal of the optical axis 110 of the optical assembly 102). The controller 210 may determine the different first non-zero angle for the optical filter 106 (e.g., based on the angle shift characteristic of the optical filter 106), and then may determine the different second non-zero angle based on the different first non-zero angle and the relationship based on the first optical thickness of the optical filter 106 and the second optical thickness of the optical compensator 108 (e.g., as described herein in relation to FIG. 1).

In this way, the controller 210 may be configured to control the respective orientations of the optical filter 106 and the optical compensator 108 to allow an optical beam, or a portion thereof, that propagates to the optical assembly 102 along the optical axis 110 of the optical assembly 102 to propagate away from the optical assembly 102 along the optical axis 110 (or by a minimized offset distance from the optical axis 110).

The one or more control components 220 includes one or more devices capable of receiving, generating, storing, processing, and/or providing information, such as the information described herein. The one or more control components 220 may include a communication device and/or a computing device. For example, the one or more control components 220 may include a wireless communication device, a wired communication device, or a combination wired and wireless communication device. In some implementations, the one or more control components 220 may receive information from and/or transmit information to another device in environment 200, such as the one or more control components 220.

In some implementations, the one or more control components 220 may be configured to adjust the respective orientations of the optical filter 106 and the optical compensator 108. Accordingly, the one or more control components 220 may include one or more adjustment components (e.g., one or more motors, such as one or more servo motors; one or more gears; one or more cams; or one or more similar components).

The controller 210 may be configured to control the respective orientations of the optical filter 106 and the optical compensator 108 (e.g., with respect to the normal of the optical axis 110 of the optical assembly 102) by transmitting information (e.g., control information) to the one or more control components 220 (e.g., to cause the one or more control components 220 to adjust the respective orientations of the optical filter 106 and the optical compensator 108). Accordingly, the one or more control components 220, based on the information transmitted by the controller 210, may adjust the respective orientations of t the optical filter 106 and the optical compensator 108.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. For example, although the controller 210 and the one or more control components 220 are described as separate devices, the controller 210 and the one or more control components 220 may be implemented as a single device. Additionally, or alternatively, a set of devices (e.g., one or more devices) of environment 200 may perform one or more functions described as being performed by another set of devices of environment 200.

Figure 3:
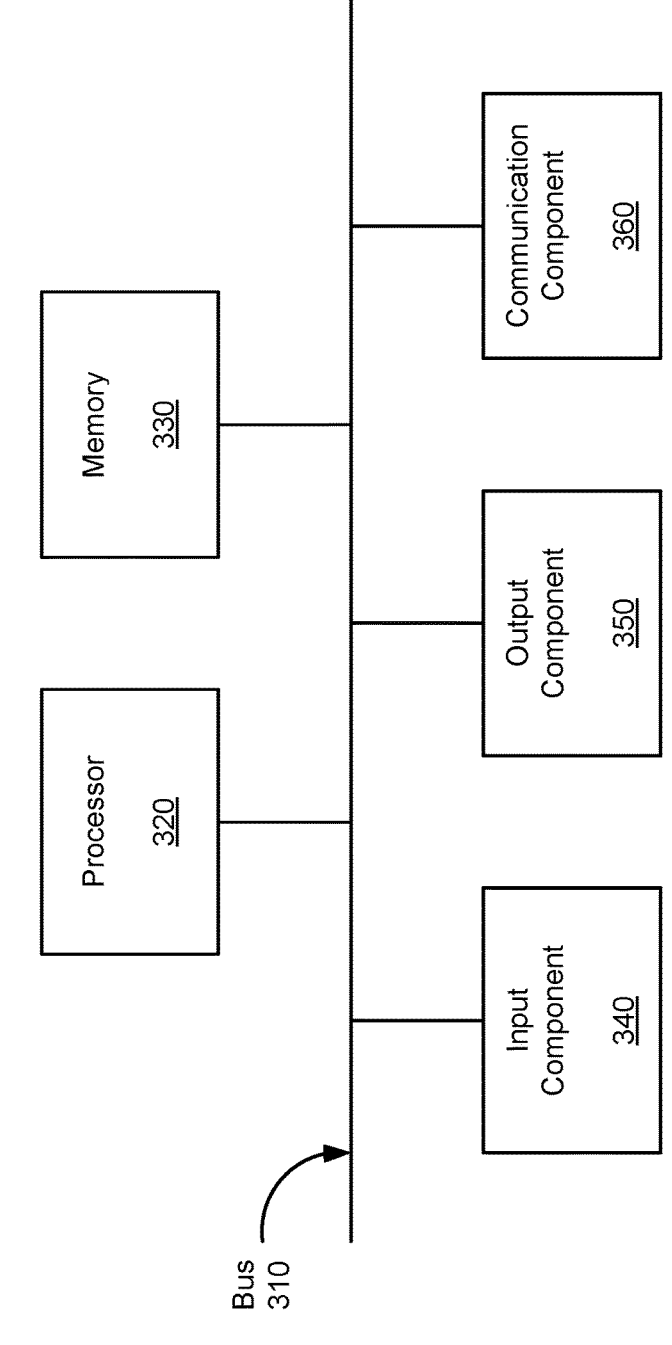
FIG. 3 is a diagram of example components of a device.

FIG. 3 is a diagram of example components of a device 300. The device 300 may correspond to the controller 210 and the one or more control components 220. In some implementations, the controller 210 and the one or more control components 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
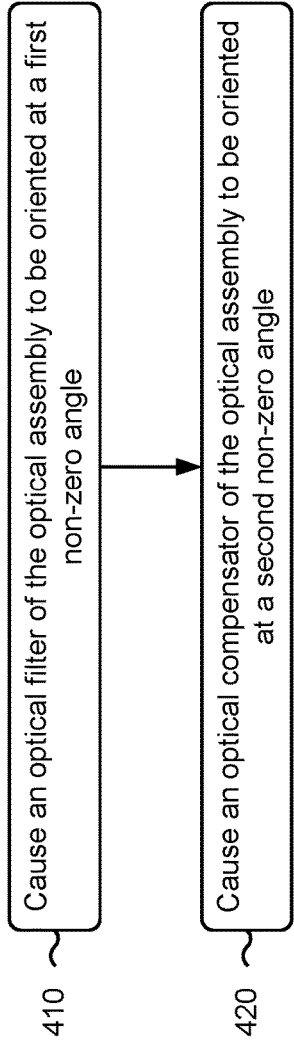
FIG. 4 is a flowchart of an example process associated with an optical assembly described herein.

FIG. 4 is a flowchart of an example process 400 associated with an optical assembly (e.g., the optical assembly 102). In some implementations, one or more process blocks of FIG. 4 are performed by a controller (e.g., the controller 210). In some implementations, one or more process blocks of FIG. 4 are performed by another device or a group of devices separate from or including the controller, such as one or more control components (e.g., the one or more control components 220). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include causing an optical filter of the optical assembly to be oriented at a first non-zero angle (block 410). For example, the controller may cause an optical filter of the optical assembly to be oriented at a first non-zero angle in a first tilt direction with respect to an optical axis of the optical assembly, as described above.

As further shown in FIG. 4, process 400 may include causing an optical compensator of the optical assembly to be oriented at a second non-zero angle (block 420). For example, the controller may cause an optical compensator of the optical assembly to be oriented at a second non-zero angle in a second tilt direction with respect to the normal of the optical axis of the optical assembly, as described above.

Process 400 may include additional implementations, such as any single implementation or any combination of implementations described below and/or in connection with one or more other processes described elsewhere herein.

In a first implementation, an absolute value of the second non-zero angle is less than an absolute value of the first non-zero angle.

In a second implementation, alone or in combination with the first implementation, process 400 includes causing the optical filter to be oriented at a different first non-zero angle in the first tilt direction with respect to the normal of the optical axis of the optical assembly, and causing the optical compensator to be oriented at a different second non-zero angle in the second tilt direction with respect to the normal of the optical axis of the optical assembly.

In a third implementation, alone or in combination with one or more of the first and second implementations, an absolute value of the different second non-zero angle is less than an absolute value of the different first non-zero angle.

In a fourth implementation, alone or in combination with one or more of the first through third implementations, process 400 includes determining the second non-zero angle based on the first non-zero angle and a relationship based on a first optical thickness of the optical filter and a second optical thickness of the optical compensator, and determining the different second non-zero angle based on the different first non-zero angle and the relationship.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical assembly comprising:
   a housing;
   an optical filter disposed within the housing,
      wherein the optical filter has a first optical thickness; and
   an optical compensator disposed with the housing, wherein:
      the optical compensator has a second optical thickness that is greater than the first optical thickness,
      the optical filter is oriented at a first non-zero angle in a first tilt direction with respect to a normal of an optical axis of the optical assembly,
      the optical compensator is oriented at a second non-zero angle in a second tilt direction, which is opposite to the first tilt direction, with respect to the normal of the optical axis of the optical assembly, and
      an absolute value of the second non-zero angle is less than an absolute value of the first non-zero angle.

2. The optical assembly of claim 1, wherein:
   the optical filter has a first index of refraction;
   the optical compensator has a second index of refraction; and
   the first index of refraction is different than the second index of refraction.

3. The optical assembly of claim 1, wherein:
   the optical filter is configured to:
      pass a portion of an optical beam that impinges on an input surface of the optical filter along the optical axis of the optical assembly, and
      cause the portion of the optical beam to propagate from an output surface of the optical filter to an input surface of the optical compensator,
         wherein the portion of the optical beam is offset from the optical axis of the optical assembly by a first offset distance; and the optical compensator is configured to:

transmit the portion of the optical beam that propagates from the output surface of the optical filter and impinges on the input surface of the optical compensator, and cause the portion of the optical beam to propagate from an output surface of the optical compensator and out of the optical assembly, wherein the optical beam propagates along the optical axis of the optical assembly or offset from the optical axis of the optical assembly by a second offset distance, wherein the second offset distance is less than the first offset distance.

4. The optical assembly of claim 1, further comprising:

a controller that is configured to control orientation of the optical filter with respect to the normal of the optical axis of the optical assembly and to control orientation of the optical compensator with respect to the normal of the optical axis of the optical assembly.

5. The optical assembly of claim 4, wherein:

the controller is configured to cause the optical filter to be oriented at a different first non-zero angle in the first tilt direction with respect to the normal of the optical axis of the optical assembly; and the controller is configured to cause the optical compensator to be oriented at a different second non-zero angle in the second tilt direction with respect to the normal of the optical axis of the optical assembly.

6. The optical assembly of claim 5, wherein:

the controller is configured to determine the second non-zero angle based on the first non-zero angle and a relationship based on the first optical thickness and the second optical thickness; and the controller is configured to determine the different second non-zero angle based on the different first non-zero angle and the relationship.

7. The optical assembly of claim 5, wherein an absolute value of the different second non-zero angle is less than an absolute value of the different first non-zero angle.

8. An optical assembly comprising:

an optical filter; and an optical compensator, wherein:

the optical filter has an optical thickness that is different than an optical thickness of the optical compensator, the optical filter is oriented at a first non-zero angle in a first tilt direction with respect to a normal of an optical axis of the optical assembly, the optical compensator is oriented at a second non-zero angle in a second tilt direction with respect to the normal of the optical axis of the optical assembly, and an absolute value of the second non-zero angle is different than an absolute value of the first non-zero angle.

9. The optical assembly of claim 8, wherein the absolute value of the second non-zero angle is less than the absolute value of the first non-zero angle.

10. The optical assembly of claim 8, wherein the optical filter has an index of refraction that is different than an index of refraction of the optical compensator.

11. The optical assembly of claim 8, wherein:

the optical filter is configured to:

pass a portion of an optical beam that impinges on an input surface of the optical filter along the optical axis of the optical assembly, and cause the portion of the optical beam to propagate from an output surface of the optical filter to an input surface of the optical compensator, wherein the portion of the optical beam is offset from the optical axis of the optical assembly by a first offset distance; and the optical compensator is configured to:

transmit the portion of the optical beam that propagates from the output surface of the optical filter and impinges on the input surface of the optical compensator, and cause the portion of the optical beam to propagate from an output surface of the optical compensator and out of the optical assembly, wherein the optical beam propagates along the optical axis of the optical assembly or offset from the optical axis of the optical assembly by a second offset distance, wherein the second offset distance is less than the first offset distance.

12. The optical assembly of claim 8, further comprising:

a controller that is configured to control respective orientations of the optical filter and the optical compensator with respect to the normal of the optical axis of the optical assembly.

13. The optical assembly of claim 12, wherein:

the controller is configured to cause the optical filter to be oriented at a different first non-zero angle in the first tilt direction with respect to the normal of the optical axis of the optical assembly; and the controller is configured to cause the optical compensator to be oriented at a different second non-zero angle in the second tilt direction with respect to the normal of the optical axis of the optical assembly.

14. The optical assembly of claim 13, wherein:

the second non-zero angle is based on the first non-zero angle and a relationship based on the optical thickness of the optical filter and the optical thickness of the optical compensator; and the different second non-zero angle is based on the different first non-zero angle and the relationship.

15. The optical assembly of claim 13, wherein an absolute value of the different second non-zero angle is different than an absolute value of the different first non-zero angle.

16. A method, comprising:

causing, by a controller of an optical assembly, an optical filter of the optical assembly to be oriented at a first non-zero angle in a first tilt direction with respect to a normal of an optical axis of the optical assembly; and causing, by the controller, an optical compensator of the optical assembly to be oriented at a second non-zero angle in a second tilt direction with respect to the normal of the optical axis of the optical assembly, wherein the optical filter has a first optical thickness that is less than a second optical thickness of the optical compensator, and wherein an absolute value of the second non-zero angle is less than an absolute value of the first non-zero angle.

17. The method of claim 16, further comprising:

causing the optical filter to be oriented at a different first non-zero angle in the first tilt direction with respect to the normal of the optical axis of the optical assembly; and causing the optical compensator to be oriented at a different second non-zero angle in the second tilt direction with respect to the normal of the optical axis of the optical assembly.

18. The method of claim 17, wherein an absolute value of the different second non-zero angle is less than an absolute value of the different first non-zero angle.

19. The method of claim 17, further comprising:
determining the second non-zero angle based on the first non-zero angle and a relationship based on the first optical thickness and the second optical thickness; and
determining the different second non-zero angle based on the different first non-zero angle and the relationship.

20. The optical assembly of claim 10, wherein the index of refraction of the optical filter is less than the index of refraction of the optical compensator.

* * * * *